United States Patent
Rudoy et al.

Patent Number: 5,221,171
Date of Patent: Jun. 22, 1993

[54] NON-EXPLOSIVE SEPARATION NUT

[75] Inventors: Edward Rudoy, Woodland Hills; Leslie Kerek, Los Angeles, both of Calif.

[73] Assignee: G & H Technology, Inc., Camarillo, Calif.

[21] Appl. No.: 961,534

[22] Filed: Oct. 15, 1992

[51] Int. Cl.⁵ .............................................. F16B 37/08
[52] U.S. Cl. ...................................... 411/433; 411/267
[58] Field of Search ............... 411/433, 267, 434, 437, 411/432, 103

[56] References Cited

U.S. PATENT DOCUMENTS

| | | |
|---|---|---|
| 2,489,613 | 11/1949 | Beswick . |
| 2,576,579 | 11/1951 | Donovan . |
| 3,160,187 | 12/1964 | Zahodiakin . |
| 3,334,536 | 8/1967 | Armstrong ........................ 411/433 |
| 4,875,266 | 10/1989 | Batten . |
| 4,929,135 | 5/1990 | Delarue et al. ................. 411/267 X |
| 4,930,961 | 6/1990 | Weis . |

Primary Examiner—Rodney M. Lindsey
Attorney, Agent, or Firm—Thomas I. Rozsa; Dong Chen

[57] ABSTRACT

The present invention is a non-explosive separation nut for fastening and releasing a threaded bolt under remote control signals. A preferred embodiment of the separation nut includes a housing, a segmented nut, a locking sleeve, a rocker and two non-explosive actuator (NEA) assemblies. The segmented nut can split radially into three or more segments and has an exterior surface with raised ridges and alternate recessed grooves. The locking sleeve is biased by a spring and placed over the segmented nut. It has an interior surface with retaining pins which are engageable with the exterior surface of the segmented nut. The locking sleeve is engaged with the two NEA assemblies through a tiltable rocker. When neither NEA assemblies is actuated, the retaining pins of the locking sleeve are engaged with the ridges of the segmented nut, so that the segments of the segmented nut are compressed radially inwardly for fastening the threaded bolt. When both or either one of the two NEA assembly is actuated, the locking sleeve will move by the biasing spring, such that the retaining pins of the locking sleeve will be engaged with the grooves of the segmented nut, so that the segments of the segmented nut can move radially outwardly for releasing the threaded bolt. The separation nut further includes two reset screws for re-positioning and re-balancing the rocker after both or either one of the two NEA assemblies are actuated, so that both or either one of the two NEA assemblies can be removed, refurbished and reassembled, and the separation nut can be reset to the fastened condition.

34 Claims, 3 Drawing Sheets

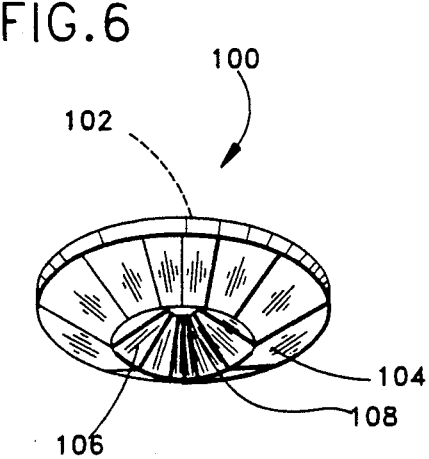
FIG. 6
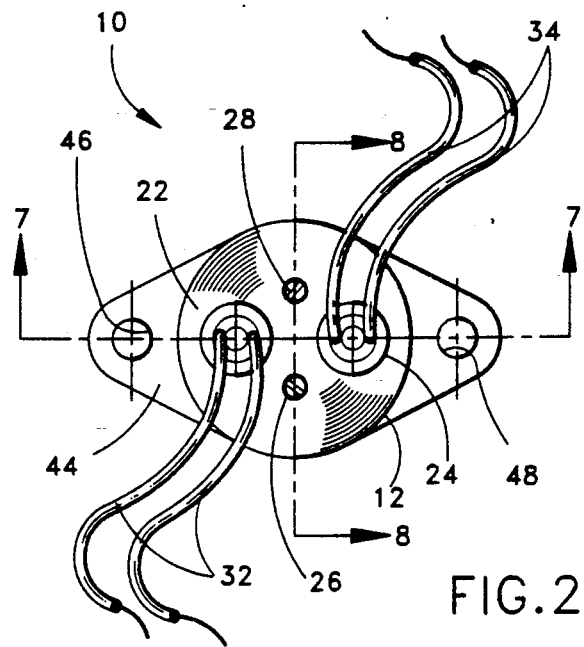
FIG. 2
FIG. 3
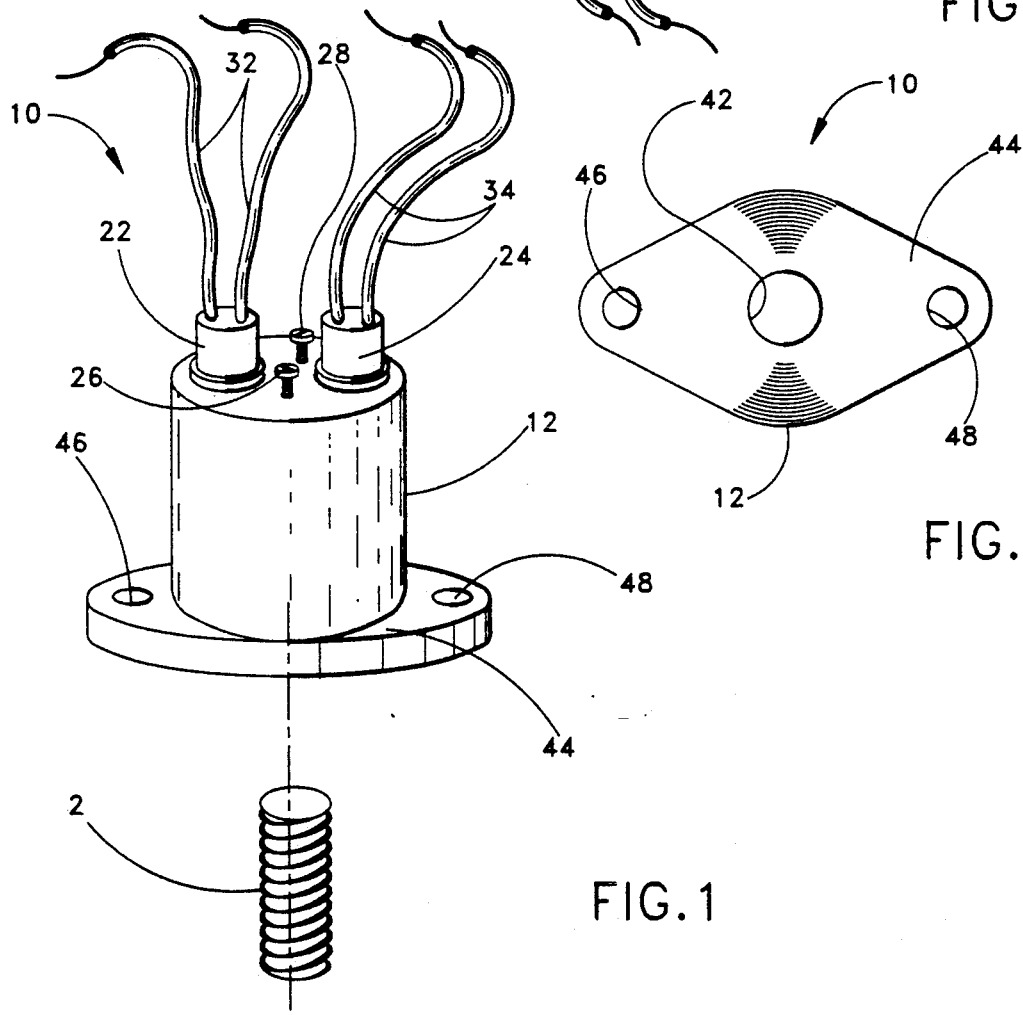
FIG. 1

NON-EXPLOSIVE SEPARATION NUT

BACKGROUND OF THE INVENTION

1. Field of the Invention

The present invention relates to the field of structural separation mechanisms. More particularly, the present invention relates to the field of remotely controlled fasteners utilizing a segmented threaded nut for fast releasing of a threaded bolt.

2. Description of the Prior Art

Separation nuts are widely used in manufacturing and construction industries. The main purpose of utilizing separation nuts is to fasten threaded bolts in a quick releasible manner. Such separation nuts are traditionally known as "quick nuts". The following five (5) prior art patents were uncovered in the pertinent field of separation nuts:

1. U.S. Pat. No. 2,489,613 issued to Beswick on Nov. 29, 1949 for "Quick Action Nut" (hereafter "the Beswick Patent").

2. U.S. Pat. No. 2,576,579 issued to Donovan on Nov. 27, 1951 for "Cone Grip Lock Nut" (hereafter "the Donovan Patent").

3. U.S. Pat. No. 3,160,187 issued to Zahodiakin on Dec. 8, 1964 for "Quick Locking Fastener With Single Movable Jaw" (hereafter "the Zahodiakin Patent").

4. U.S. Pat. No. 4,875,266 issued to Batten on Oct. 24, 1989 for "Releasable High Torque Fastener" (hereafter "the Batten Patent").

5. U.S. Pat. No. 4,930,961 issued to Weis on Jun. 5, 1990 for "Quick Lock And Release Fastener" (hereafter "the Weis Patent").

The Batten Patent discloses an easily releasable fastener specially designed for high torque applications. The releasable fastener comprises a washer, a nut and a retaining ring. The nut has three threaded segments, all retained by the retaining ring. A threaded bolt can be threaded into the three-segmented nut, and the retaining ring acts to keep the fastener together as a unit. A retractor is provided for manually removing the retaining ring to release the bolt.

The Weis Patent discloses a quick lock and release fastener. The quick fastener comprises a split threaded nut operable within a drive plate and an operating head fixed with the drive plate. The split nut and the drive plate have a cam engagement for fastening or releasing a threaded bolt. A semi-circular compression spring is provided for facilitating the separation of the two segments of the split nut. The fastening or releasing of the split nut is controlled by the rotational movement of the drive plate.

The Beswick Patent discloses a quick action nut having a three-segment internal nut contained in a fixed housing. Each segment of the split nut is independently engaged with a spring biased pin. The segments of the spilt nut further have outer ribs which are engageable with the inner grooves of the housing. There is no retaining pin utilized.

The Donovan Patent discloses a quick grip lock nut utilizing a three-segmented nut adapted to secure the skin of airplane wings. The fastening or releasing of the segmented nut is controlled through spring members. No vertically moveable sleeve is utilized for controlling the fastening or releasing of the segmented nut.

The Zahodiakin Patent discloses a quick locking nut with a self-contained compression spring for biasing a movable clamping jaw. The clamping jaw is biased by a compression spring. The locking nut utilizes no segmented nut.

It can be seen that many prior art quick nuts have utilized a segmented threaded nut. Typically the segmented threaded nut includes three threaded segments. To retain a threaded element such as a threaded bolt, the threaded segments are tightened together by various means, including a circular sleeve, a cam disc, a biasing spring, etc. To release the threaded bolt, the threaded segments are loosened. Traditional separation nuts are often released by manual and local operations.

However, in many situations such as in aerospace applications, it is often required that the releasing of the separation nuts be remotely controlled. One type of separation nut used in the aerospace industry utilizes explosive initiators such as squibs for a remotely controlled release, and are known as "explosive separation nuts". However, in many aerospace apparatus such as satellites, it is highly desirable to employ separation nuts which utilize a non-explosive releasing mechanism because the separation nuts are located very close to highly sensitive electronic modules.

In addition to the requirement that the separation be performed in a non-explosive manner, the separation nuts used in aerospace applications must also satisfy other critical requirements. For example, the separation nuts often need to be very small (such as less than one inch long) and very lightweight (such as a few ounces), but must be able to tolerate a very high tensile load (such as up to ten thousand pounds). Therefore, it is highly desirable to have a very efficient and also very effective design and construction of a new non-explosive separation nut which can be used in various applications, particularly in the aerospace industry.

SUMMARY OF THE INVENTION

The present invention is a non-explosive separation nut which can be remotely controlled to very quickly release a threaded bolt. The primary object of the present invention is to provide a structural support for a bolted joint that can be remotely separated by sending an electrical or other signal without the use of explosive initiators.

It is known that segmented threaded nuts have been utilized in prior art quick nuts. The prior art segmented threaded nuts often include three or more threaded segments. The threaded segments are held together by various means, including a circular sleeve, a cam disc, a biasing spring, etc., for retaining a threaded bolt. The prior art separation nuts are often released by manual and local operations.

The present invention is a novel and unique remotely controlled separation nut particularly designed for aerospace applications. It has been discovered, according to the present invention, that in many situations such as in aerospace applications, it is highly desirable to employ separation nuts which utilize a non-explosive releasing mechanism because the separation nuts are located very close to highly sensitive electronic equipment. Therefore, it is an important object of the present invention to provide a separation nut which utilizes only non-explosive releasing mechanisms that can be remotely controlled.

It has also been discovered, according to the present invention, that in many situations such as in aerospace applications, it is highly desirable to employ separation nuts that are compact in size, light in weight and adequate in capacity. Therefore, it is another object of the present invention to provide a separation nut which has very efficient and very effective design and construction.

It has been further discovered, according to the present invention, that in many situations such as in aerospace applications, it is highly desirable to employ separation nuts that are capable of incorporating a multiplicity of actuating operations. Therefore, it is also an object of the present invention to provide a separation nut which includes a unique rocker that can be tilted in any direction relative to a pivot point. The rocker can be balanced by two actuators and if any one of the two actuators is actuated, then the rocker will tilt in order to release the threaded bolt, so that the separation nut satisfies the redundancy requirement of the actuating operation.

It has been additionally discovered, according to the present invention, that in many situations such as in aerospace applications, it is highly desirable to be able to remove, refurbish and reassemble the non-explosive actuators. Therefore, it is a further object of the present invention to provide a separation nut with a reset mechanism which allows the non-explosive actuators to be removed, refurbished and reassembled and resets the separation nut to a ready-to-fasten condition.

Described generally, the present invention is a non-explosive separation nut attachable to an external structure for fastening and releasing a threaded bolt through remote control signals. The preferred embodiment of the present invention separation nut basically includes a cylindrical shaped housing, a segmented nut, a locking sleeve, a rocker and two non-explosive actuator (NEA) assemblies. The housing has a top end, a bottom end and a tubular sidewall, where the bottom end has a central opening which extends into a hollow chamber of the housing. The segmented nut is located inside the chamber of the housing adjacent to the bottom end. It has a threaded bore aligned with the bottom opening for receiving the threaded bolt. It also has a hexagonal exterior surface which has a multiplicity of raised ridges and alternatively disposed recessed grooves. The segmented nut splits radially into a multiplicity of segments.

The locking sleeve is placed over the segmented nut and has a hexagonal interior surface which has a multiplicity of retaining pins engageable with the exterior surface of the segmented nut. When the retaining pins are engaged with the ridges, the segments of the segmented nut are compressed radially inwardly for fastening the threaded bolt, which sets the separation nut in a fastened condition. When the retaining pins are engaged with the grooves, the segments of said segmented nut can move radially outwardly for releasing the threaded bolt, which sets said separation nut in a released condition. The rocker is placed above the locking sleeve and has a flat top side and a tapered bottom side with an inverted conical shaped central recess for engaging a top protrusion of the locking sleeve.

Two NEA assemblies are symmetrically mounted on the top end of the housing for operating two plunger retainers respectively. Each NEA assembly has a spool operable by the remote control signals for resisting or allowing a respective one of the two plunger retainers to move upwardly. The two plunger retainers contact the flat top side of the rocker symmetrically for balancing the rocker against the locking sleeve which is biased upwardly by a compression spring. When neither NEA assemblies is actuated, the separation nut will maintain the fastened condition. When both or either one of the NEA assemblies are actuated by the remote control signals, the separation nut will shift to the released condition.

The preferred embodiment of the present invention separation nut further includes two reset screws with each respectively threaded through a selected one of two screw holes at the top end of the housing. The two reset screws symmetrically contact the flat top side of the rocker for re-positioning and re-balancing the rocker after both or either one of the two NEA assemblies are actuated, so that both or either one of the two NEA assemblies can be removed, refurbished and reassembled, and the separation nut can be reset to the fastened condition.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a perspective view of the present invention non-explosive separation nut and a threaded bolt.

FIG. 2 is a top plan view of the present invention non-explosive separation nut.

FIG. 3 is a bottom plan view of the present invention non-explosive separation nut.

FIG. 6 is a perspective view of the rocker used in the present invention non-explosive separation nut.

DESCRIPTION OF THE PREFERRED EMBODIMENT

Figure 4:
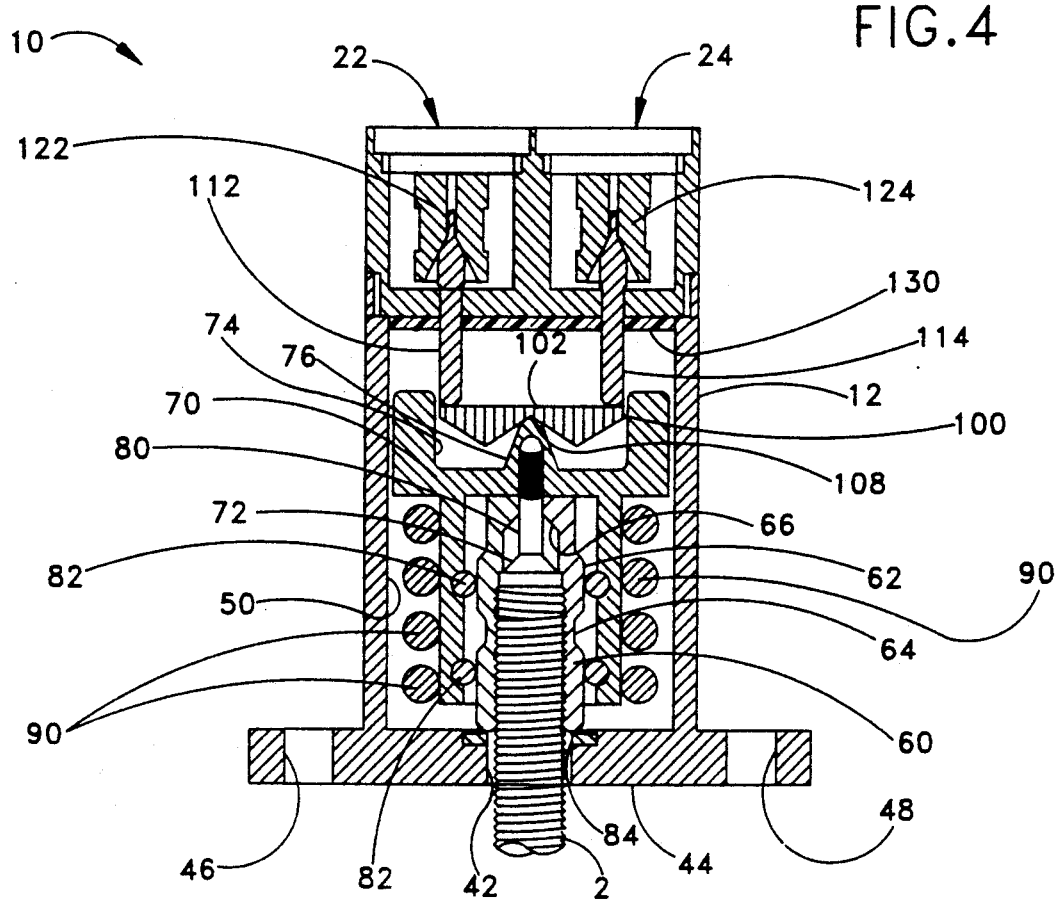
FIG. 4 is a cross-sectional view of the present invention non-explosive separation nut in its fastened condition.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Described briefly, the present invention is a non-explosive separation nut. A preferred embodiment of the separation nut includes a housing, a segmented nut, a locking sleeve, a rocker and two non-explosive actuator (NEA) assemblies. The segmented nut can split radially into three or more segments and has an exterior surface with raised ridges and alternate recessed grooves. The locking sleeve is biased by a spring and has an interior surface with retaining pins that are engageable with the exterior surface of the segmented nut.

The locking sleeve is engaged with the two NEA assemblies through the tiltable rocker. When neither NEA assembly is actuated, the retaining pins of the locking sleeve are engaged with the ridges of the segmented nut, so that the segments of the segmented nut are compressed radially inwardly for fastening the threaded bolt. When both or either one of the two NEA assemblies is actuated, the locking sleeve will be moved by the biasing spring such that its retaining pins will be engaged with the grooves of the segmented nut, so that the segments of the segmented nut can move radially outwardly for releasing the threaded bolt.

Referring to FIG. 1, there is shown at 10 a preferred embodiment of the present invention non-explosive separation nut for fastening and releasing a threaded bolt 2. The top and bottom plan views of the non-explosive separation nut 10 are shown respectively in FIGS. 2 and 3. The non-explosive separation nut 10 has a generally cylindrical shaped housing 12. At the top of the housing 12 there are two non-explosive actuator (NEA) assemblies 22 and 24, and two reset bolts 26 and 28. Remote control cables 32 and 34 are connected respectively to the two NEA assemblies 22 and 24 for transmitting electrical or optical signals. At the bottom of the housing 12 there is a central hole 42 extending into the housing 12 for receiving the threaded bolt 2. The housing 12 also has a widened bottom flange 44 which has two holes 46 and 48 for mounting the housing 12 to an external structure.

Referring to FIG. 4, there is shown a cross-sectional view of the present invention non-explosive separation nut 10 in its fastened condition. The housing 12 of the non-explosive separation nut 10 has an internal hollow chamber 50. The threaded bolt 2 extends into the hollow chamber 50 through the bottom hole 42 of the housing 12, and engages with the segmented nut 60 which has the same thread size and is split radially into three or more segments. For example, in the preferred embodiment the segmented nut 60 is split radially into three segments. Each segment of the segmented nut 60 has raised ridges 62 and recessed grooves 64 on its exterior surface. The height of the raised ridges 62 or the depth of the recessed grooves 64 is greater than the height of the threads on the interior surface of the segmented nut 60.

The segments of the segmented nut 60 are confined by a locking sleeve 70 which has a generally cylindrical shaped exterior surface and hexagonal shaped interior surface. Two or more retaining pins 72 are provided on the interior surface of the locking sleeve 70. The retaining pins 72 are raised above the interior surface of the locking sleeve 70 by more than the height of the threads on the interior surfaces of the segments of the segmented nut 60 and by not less than the height of the raised ridges 62 or the depth of the recessed grooves 64 on the exterior surfaces of the segments of the segmented nut 60. When the non-explosive separation nut 10 is in the fastened condition for retaining the threaded bolt 2, the retaining pins 72 rest on the raised ridges 62 of the segmented nut 60, thereby confining the segments of the segmented nut 60 together to fasten the threaded bolt 2.

Figure 5:
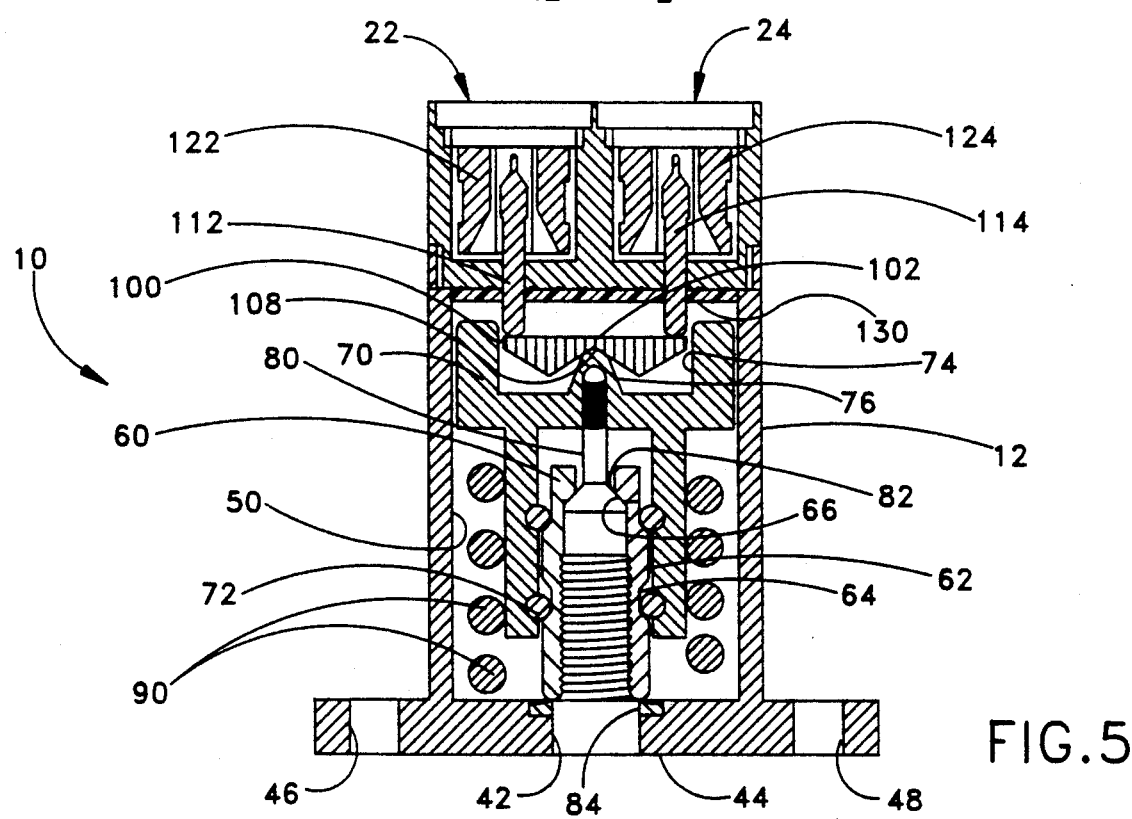
FIG. 5 is a cross-sectional view of the present invention non-explosive separation nut in its released condition.

Referring to FIG. 5, there is shown a cross-sectional view of the present invention non-explosive separation nut 10 in its released condition. To separate the threaded bolt 2 from the non-explosive separation nut 10, the locking sleeve 70 has to move relative to the segmented nut 60 until the retaining pins 72 are aligned with and resting within the recessed grooves 64 of the segmented nut 60. This will allow the segments of the segmented nut 60 to move radially away from the threaded bolt 2 and to thereby disengage the threads. The loading weight of the threaded bolt 2 will also provide a partial force to separate the segments of the segmented nut 60.

In addition, a ramp plunger 80 is mounted inside the lock sleeve 70 for facilitating the separation of the segments of the segmented nut 60 in the released condition of the non-explosive separation nut 10. The ramp plunger 80 has an outward ramp surface 82 which is engaged with inward ramp surfaces 66 of the segments of the segmented nut 60 when the retaining pins 72 are aligned with and rest within the recessed grooves 64 of the segmented nut 60. The sliding of the inward ramp surfaces 66 of the segments of the segmented nut 60 over the outward ramp surface 82 of the ramp plunger 80 will ensure the separation of the segments of the segmented nut 60.

Furthermore, a ramp washer 84 is provided at the bottom hole 42 of the housing 12 for assisting the separation of the segments of the segmented nut 60 in the released condition of the non-explosive separation nut 10. The sliding of the bottom ends of the segments of the segmented nut 60 over the ramp washer 84 will further ensure the separation of the segments of the segmented nut 60.

The energy for providing the relative motion between the locking sleeve 70 and the segmented nut 60 is stored in a compression spring 90. The compression spring 90 is under compression when the non-explosive separation nut 10 is in the unreleased condition. The containment of the compression spring 90 is accomplished by the two NEA assemblies through a rocker 100 and two plunger retainers 112 and 114.

The unique configuration of the rocker 100 is shown in FIG. 6. The rocker 100 is constructed like a disc with a flat top side 102 and a tapered bottom side 104 with an inverted conical shaped central recess 106. The center of the bottom recess 106 defines a pivot point 108 of the rocker 100.

The purpose of using two NEA assemblies 22 and 24 and two plunger retainers 112 and 114 with the rocker 100 is to provide redundancy of actuating operation for backup and safety. In an alternative embodiment of the present invention non-explosive separation nut wherein redundancy is not required, only one NEA assembly is needed and its plunger retainer can be directly engaged with the locking sleeve without the rocker.

Shown in FIGS. 4 and 5, a top recess 74 with an inner protrusion 76 is provided on the locking sleeve 70 for supporting the rocker 100. When the rocker 100 is placed within the top recess 74 by having the bottom recess 106 of the rocker 100 positioned above the protrusion 76, the rocker 100 can be tilted in any direction relative to the pivot point 108 of the rocker 100 without the risk of slipping off the protrusion 76. This is because first, the protrusion 76 is engaged to the inverted conical shaped recess 106 of the rocker 100; and second, the rocker 100 is confined by the top recess 74 of the locking sleeve 70. The two plungers 112 and 114 are symmetrically engaged with the flat top side 102 of the rocker 100 in two opposite locations to hold the rocker 100 in balance.

The two NEA assemblies 22 and 24 are independently and remotely controlled by electrical, optical or other signals. The NEA assembly 22 has a spool 122 for supporting the plunger retainer 112, and the NEA assembly 24 has a spool 124 for supporting the plunger retainer 114. When the two NEA assemblies 22 and 24 are not actuated as shown in FIG. 4, spools 122 and 124 are engaged and resist the moving of the plunger retainers 112 and 114 respectively. The plunger retainers 112 and 114 in turn keep the locking sleeve 70 from being moved upwardly by the compression spring 90, maintaining the segmented nut 60 in the fastened condition. When the two NEA assemblies 22 and 24 are actuated as shown in FIG. 5, spools 122 and 124 are disengaged and allow the plunger retainers 112 and 114 to move upwardly through the respective centers of the disengaged spools 122 and 124. The plunger retainers 112 and 114 in turn allow the locking sleeve 70 to move upwardly through action of the compression spring 90, liberating the segmented nut 60 to the released condition.

Figure 7:
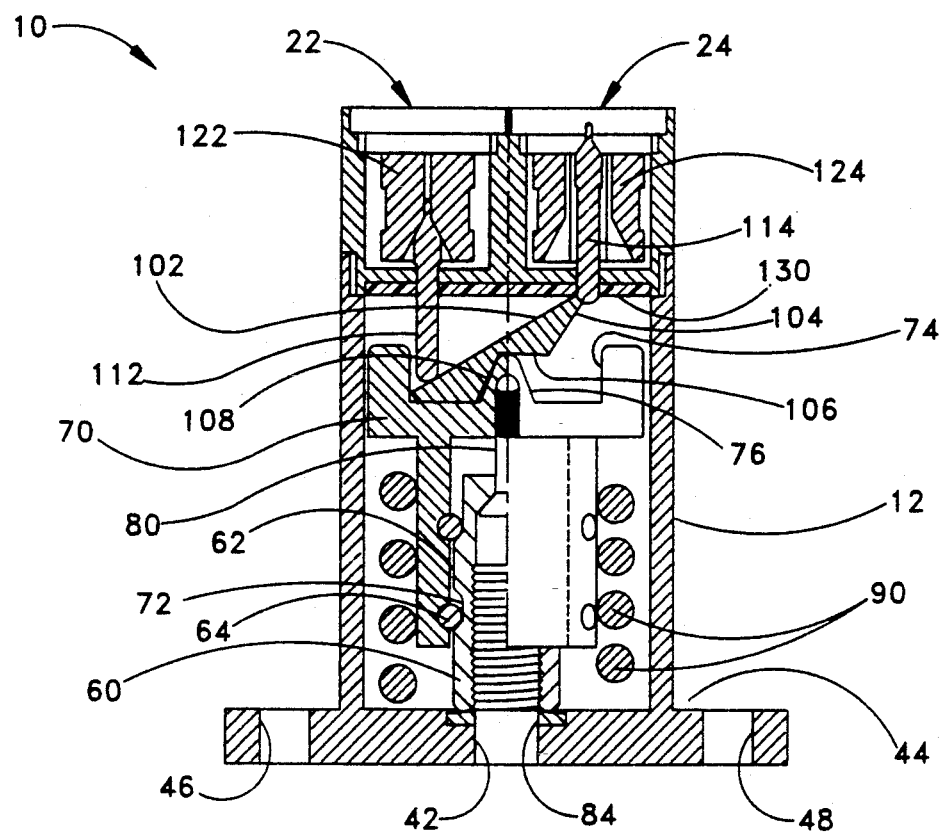
FIG. 7 is a cross-sectional view of the present invention non-explosive separation nut in its released condition, where only one non-explosive actuator is actuated.

Referring to FIG. 7, if only one of the two NEA assemblies 22 and 24 is actuated, then the rocker 100 will tilt, allowing the locking sleeve 70 to move and release the threaded bolt 2. For example, as shown in FIG. 7, the NEA assembly 22 is not actuated, whereas the NEA assembly 24 is actuated. The spool 122 of the NEA assembly 22 is engaged and resists the movement of the plunger retainer 112, but the spool 124 of the NEA assembly 24 is disengaged and allows the movement of the other plunger retainer 114. Because the rocker 100 is pivotally supported, it allows the upward movement of the locking sleeve 70 even though only one of the two NEA assemblies is actuated. This arrangement satisfies the requirement for redundancy of actuating operation. In the event this single actuation fails to release the threaded bolt 2, the second NEA assembly 22 can be actuated so that spool 122 becomes disengaged, thereby permitting plunger retainer 112 to move through spool 122 to permit locking sleeve 70 to move upward on its other side so that the segmented nut is separated to relieve the threaded bolt 2. This redundancy feature thereby provides a duplicate operation to help prevent failure of the system.

Figure 8:
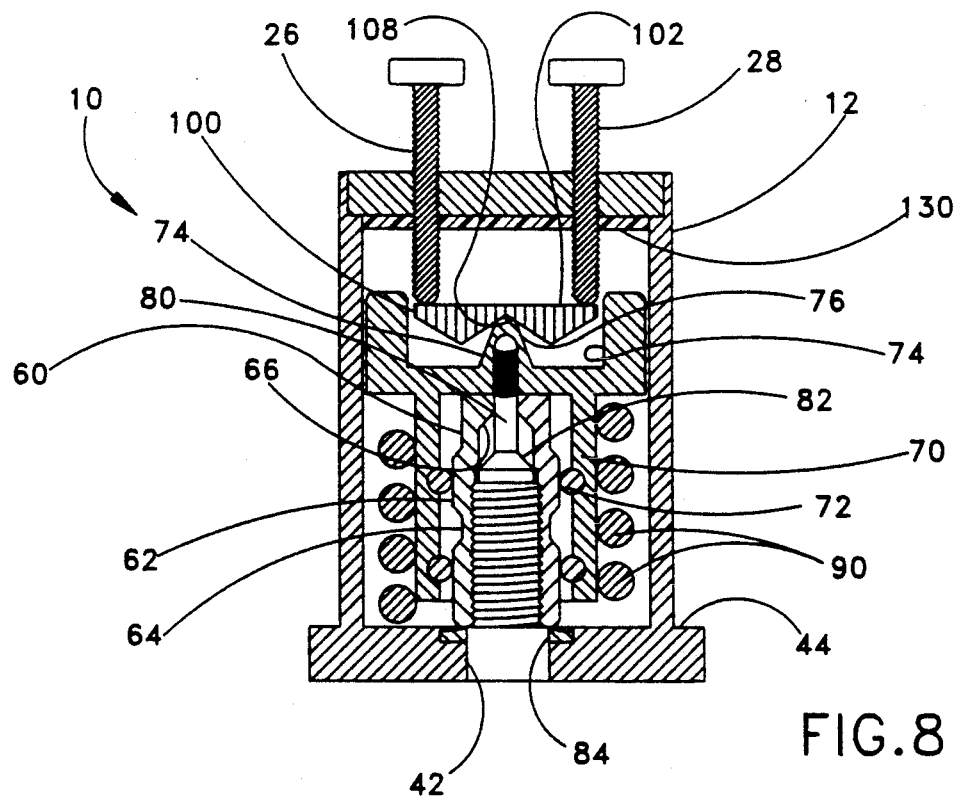
FIG. 8 is a cross-sectional view showing how to reset the present invention non-explosive separation nut.

Referring to FIG. 8, there is shown the method of resetting the non-explosive separation nut 10. To reset the position of the rocker 100, two threaded screws 26 and 28 are provided at the top of the housing 12. The two reset screws 26 and 28 symmetrically contact the flat top side 102 of the rocker 100 at two opposite locations to the pivot point 108. Preferably the reset screws 26 and 28 are aligned perpendicular to the two NEA assemblies 22 and 24. When the two reset screws 26 and 28 are tightened simultaneously, the rocker 100 is returned to its lower balanced position, and the locking sleeve 70 is pushed downwardly. The downward movement of the locking sleeve 70 will compress the compression spring 90 and move the retaining pins 72 from the recessed grooves 64 of the segmented nut 60 to the raised ridges 62. When the two reset screws 26 and 28 are tightened in, the two NEA assemblies 22 and 24 can be removed, refurbished and reassembled. Once the two NEA assemblies 22 and 24 are reinstalled, the reset screws 26 and 28 can be removed. This will result in lining up the segments of the segmented nut 60 in proper polarization toward the center of the housing 12 to form a full threaded configuration for accepting the threaded bolt 2. In this way the non-explosive separation nut 10 is back to its fastened condition.

To reduce the shock from the possible impact of the locking sleeve 70, a resilient gasket 130 can be placed above the locking sleeve 70 as shown in FIG. 8. The gasket 130 may be a rubber made component or a spring, and functions to cushion the impact of the locking sleeve 70.

The present invention non-explosive separation nut has many advantageous features, including: (a) it utilizes the NEA assemblies, so the separation of the nut will not disturb any other nearby highly sensitive components; (b) it can be remotely controlled by electrical, optical or other signals; (c) it satisfies the redundancy requirement of the actuating operation by employing a unique shaped rocker to provide duplicate operation to reduce system failure; (d) it has a structure which is capable of tolerating very high tensile loads; (e) the condition of the separation nut can be quickly reset and the NEA assemblies can be easily removed, refurbished and reassembled; and (f) it has a very compact design and is very lightweight.

Defined in detail, the present invention is a non-explosive separation nut attachable to an external structure for fastening and releasing a threaded bolt under remote control signals, the separation nut comprising: (a) a cylindrical shaped housing having a top end, a bottom end and a tubular sidewall, the bottom end having a central opening extending into a hollow chamber of the housing; (b) a segmented nut located inside said chamber adjacent to said bottom end, the segmented nut having a threaded bore aligned with said bottom opening for receiving said threaded bolt, the segmented nut also having a hexagonal exterior surface which has a multiplicity of raised ridges and a multiplicity of recessed grooves which are located alternatively relatively to the multiplicity of ridges, the segmented nut split radially into a multiplicity of segments; (c) a locking sleeve placed over said segmented nut and having a hexagonal interior surface which has a multiplicity of retaining pins engageable with said exterior surface of said segmented nut, such that when the multiplicity of retaining pins are engaged with said multiplicity of ridges, said multiplicity of segments of said segmented nut are compressed radially inwardly for fastening said threaded bolt, which sets said separation nut in a fastened condition, and when the multiplicity of retaining pins are engaged with said multiplicity of grooves, said multiplicity of segments of said segmented nut can move radially outwardly for releasing said threaded bolt, which sets said separation nut in a released condition; (d) a rocker placed above said locking sleeve and having a flat top side and a tapered bottom side with an inverted conical shaped central recess for engaging a top protrusion of said locking sleeve; and (e) two non-explosive actuator assemblies symmetrically mounted on said top end of said housing for operating a respective one of two plunger retainers, each non-explosive actuator assembly having a spool operable by said remote control signals for resisting or allowing a respective one of the two plunger retainers to move upwardly, the two plunger retainers symmetrically contacting said flat top side of said rocker for balancing said rocker against said locking sleeve which is biased upwardly by a spring means; (f) whereby when neither one of said two non-explosive actuator assemblies is actuated, said separation nut will maintain said fastened condition, and when both or either one of said non-explosive actuator assemblies are actuated by said remote control signals, said separation nut will shift to said released condition.

Defined broadly, the present invention is a non-explosive separation nut for fastening and releasing a threaded bolt under remote control signals, the separation nut comprising: (a) a housing having a top end and a bottom end with a central opening extending into a hollow chamber; (b) a segmented nut located inside said chamber adjacent to said bottom end, the segmented nut having a threaded bore aligned with said bottom opening for receiving said threaded bolt, the segmented nut also having a polygonal exterior surface which has at least two raised ridges and at least two recessed grooves which are located alternatively relatively to the ridges, the segmented nut split radially into at least three segments; (c) a locking sleeve placed over said segmented nut and having a polygonal interior surface complementary to said polygonal exterior surface of said segmented nut, the polygonal interior surface of the locking sleeve has at least two retaining pins engageable with said exterior surface of said segmented nut, such that when the at least two retaining pins are engaged with said at least two ridges, said at least three segments of said segmented nut are compressed radially inwardly for fastening said threaded bolt, which sets said separation nut in a fastened condition, and when the at least two retaining pins are engaged with said at least two grooves, said at least three segments of said segmented nut can move radially outwardly for releasing said threaded bolt, which sets said separation nut in a released condition; (d) a rocker placed above said locking sleeve and having a top side and a bottom side with a central recess for engaging a top protrusion of said locking sleeve; and (e) at least one non-explosive actuator assembly mounted on said top end of said housing for operating at least one plunger retainer, the at least one non-explosive actuator assembly having a spool operable by said remote control signal for resisting or allowing the at least one plunger retainer to move upwardly, the at least one plunger retainer contacting said top side of said rocker for balancing said rocker against said locking sleeve which is biased upwardly by a spring means; (f) whereby when said at least one non-explosive actuator assembly is not actuated, said separation nut will maintain said fastened condition, and when said at least one non-explosive actuator assembly is actuated by said remote control signals, said separation nut will shift to said released condition.

Defined more broadly, the present invention is a separation nut for fastening and releasing a threaded element, the separation nut comprising: (a) a housing having a top end and a bottom end with an opening extending into a hollow chamber; (b) a segmented nut located inside said chamber, the segmented nut having a threaded bore aligned with said bottom opening for receiving said threaded element, the segmented nut also having an exterior surface which has at least one raised ridge and at least one recessed groove, the segmented nut split radially into at least two segments; (c) a locking sleeve biased by a spring means and placed over said segmented nut having an interior surface complementary to said exterior surface of said segmented nut, the interior surface of the locking sleeve has at least one retaining pin engageable with said exterior surface of said segmented nut; and (d) at least one actuator assembly mounted on said top end of said housing for resisting or allowing said locking sleeve to move upwardly; (e) whereby when said at least one actuator assembly is not actuated, said at least one retaining pin is engaged with said at least one ridge, so that said at least two segments of said segmented nut are compressed radially inwardly for fastening said threaded element, and when said at least one actuator assembly is actuated, said locking sleeve will move upwardly biased by said spring means, such that said at least one retaining pin will be engaged with said at least one groove, so that said at least two segments of said segmented nut can move radially outwardly for releasing said threaded element.

Defined even more broadly, the present invention is a separation nut for fastening and releasing a structural element, comprising: (a) a housing having an opening extending into a hollow chamber; (b) a segmented nut located inside said chamber, the segmented nut having a bore aligned with said opening for receiving said structural element, the segmented nut also having an exterior surface which has at least one raised ridge and at least one recessed groove, the segmented nut split radially into at least two segments; (c) a locking sleeve biased by a spring means and placed over said segmented nut having an interior surface which has at least one retaining pin engageable with said exterior surface of said segmented nut; and (d) a rocker means for preventing or allowing said locking sleeve to move; (e) whereby when said locking sleeve is prevented from moving, said at least one retaining pin is engaged with said at least one ridge, so that said at least two segments of said segmented nut are compressed radially inwardly for fastening said structural element, and when said locking sleeve is allowed to move, said at least one retaining pin will be engaged with said at least one groove, so that said at least two segments of said segmented nut can move radially outwardly for releasing said structural element.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A non-explosive separation nut attachable to an external structure for fastening and releasing a threaded bolt under remote control signals, the separation nut comprising:

a. a cylindrical shaped housing having a top end, a bottom end and a tubular sidewall, the bottom end having a central opening extending into a hollow chamber of the housing;

b. a segmented nut located inside said chamber adjacent to said bottom end, the segmented nut having a threaded bore aligned with said bottom opening for receiving said threaded bolt, the segmented nut also having a hexagonal exterior surface which has a multiplicity of raised ridges and a multiplicity of recessed grooves which are located alternatively with the multiplicity of ridges, the segmented nut split radially into a multiplicity of segments;

c. a locking sleeve placed over said segmented nut and having a hexagonal interior surface which has a multiplicity of retaining pins engageable with said exterior surface of said segmented nut, such that when the multiplicity of retaining pins are engaged with said multiplicity of ridges, said multiplicity of segments of said segmented nut are compressed radially inwardly for fastening said threaded bolt, which sets said separation nut in a fastened condition, and when the multiplicity of retaining pins are engaged with said multiplicity of grooves, said multiplicity of segments of said segmented nut can move radially outwardly for releasing said threaded bolt, which sets said separation nut in a released condition;

d. a rocker placed above said locking sleeve and having a flat top side and a tapered bottom side with an inverted conical shaped central recess for engaging a top protrusion of said locking sleeve; and e. two non-explosive actuator assemblies symmetrically mounted on said top end of said housing for operating a respective one of two plunger retainers, each non-explosive actuator assembly having a spool operable by said remote control signals for resisting or allowing a respective one of the two plunger retainers to move upwardly, the two plunger retainers symmetrically contacting said flat top side of said rocker for balancing said rocker against said locking sleeve which is biased upwardly by a spring means;

f. whereby when neither one of said two non-explosive actuator assemblies is actuated, said separation nut will maintain said fastened condition, and when both or either one of said non-explosive actuator assemblies are actuated by said remote control signals, said separation nut will shift to said released condition.

2. The invention as defined in claim 1 wherein said bottom end of said housing has a widened flange with means for mounting said housing to said external structure.

3. The invention as defined in claim 2 wherein said means for mounting the housing to said external structure includes two symmetrically located screw holes to accommodating two mounting screws respectively for mounting said housing to said external structure.

4. The invention as defined in claim 1 wherein said segmented nut splits radially into three segments.

5. The invention as defined in claim 1 wherein said locking sleeve has a cylindrical shaped exterior surface and said spring means is a compression spring wound on the cylindrical shaped exterior surface of said locking sleeve.

6. The invention as defined in claim 1 wherein said threaded bore of said segmented nut has an inward ramp surface engageable with an outward ramp surface on a ramp plunger which is attached inside said locking sleeve for facilitating said radially outward movement of said multiplicity of segments of said segmented nut.

7. The invention as defined in claim 1 further comprising a ramp washer located adjacent to said bottom opening of said housing and engageable with said segmented nut for assisting said radially outward movement of said multiplicity of segments of said segmented nut.

8. The invention as defined in claim 1 further comprising two reset screws respectively threaded through two screw holes at said top end of said housing, the two reset screws symmetrically contacting said flat top side of said rocker for re-positioning and re-balancing said rocker after both or either one of said two non-explosive actuator assemblies are actuated, so that both or either one of said two non-explosive actuator assemblies can be removed, refurbished and reassembled and said separation nut can be reset to said fastened condition.

9. The invention as defined in claim 8 wherein said two plunger retainers are aligned in a first direction and said two reset screws are aligned in a second direction perpendicular to the first direction.

10. The invention as defined in claim 1 further comprising means for cushioning potential impact resulting from the upward movement of said locking sleeve biased by said spring means.

11. A non-explosive separation nut for fastening and releasing a threaded bolt under remote control signals, the separation nut comprising:

a. a housing having a top end and a bottom end with a central opening extending into a hollow chamber;

b. a segmented nut located inside said chamber adjacent to said bottom end, the segmented nut having a threaded bore aligned with said bottom opening for receiving said threaded bolt, the segmented nut also having a polygonal exterior surface which has at least two raised ridges and at least two recessed grooves which are located alternatively relative to the ridges, the segmented nut split radially into at least three segments;

c. a locking sleeve placed over said segmented nut and having a polygonal interior surface complementary to said polygonal exterior surface of said segmented nut, the polygonal interior surface of the locking sleeve has at least two retaining pins engageable with said exterior surface of said segmented nut, such that when the at least two retaining pins are engaged with said at least two ridges, said at least three segments of said segmented nut are compressed radially inwardly for fastening said threaded bolt, which sets said separation nut in a fastened condition, and when the at least two retaining pins are engaged with said at least two grooves, said at least three segments of said segmented nut can move radially outwardly for releasing said threaded bolt, which sets said separation nut in a released condition;

d. a rocker placed above said locking sleeve and having a top side and a bottom side with a central recess for engaging a top protrusion of said locking sleeve; and e. at least one non-explosive actuator assembly mounted on said top end of said housing for operating at least one plunger retainer, the at least one non-explosive actuator assembly having a spool operable by said remote control signal for resisting or allowing the at least one plunger retainer to move upwardly, the at least one plunger retainer contacting said top side of said rocker for balancing said rocker against said locking sleeve which is biased upwardly by a spring means;

f. whereby when said at least one non-explosive actuator assembly is not actuated, said separation nut will maintain said fastened condition, and when said at least one non-explosive actuator assembly is actuated by said remote control signals, said separation nut will shift to said released condition.

12. The invention as defined in claim 11 wherein said bottom end of said housing has a widened flange with means for mounting said housing to an external structure.

13. The invention as defined in claim 12 wherein said means for mounting the housing to said external structure includes at least one screw hole to accommodating at least one mounting screw for mounting said housing to said external structure.

14. The invention as defined in claim 11 wherein said locking sleeve has a generally cylindrical shaped exterior surface and said spring means is a compression spring wound on the generally cylindrical shaped exterior surface of said locking sleeve.

15. The invention as defined in claim 11 wherein said threaded bore of said segmented nut has an inward ramp surface engageable with an outward ramp surface on a ramp plunger which is attached inside said locking sleeve for facilitating said radially outward movement of said at least three segments of said segmented nut.

16. The invention as defined in claim 11 further comprising a ramp washer located adjacent to said bottom opening of said housing and engageable with said segmented nut for assisting said radially outward movement of said at least three segments of said segmented nut.

17. The invention as defined in claim 11 further comprising at least one reset screw threaded through at least one screw hole at said top end of said housing, the at least one reset screw contacting said top side of said rocker for re-positioning and re-balancing said rocker after said at least one non-explosive actuator assembly is actuated, so that said at least one non-explosive actuator assembly can be removed, refurbished and reassembled and said separation nut can be reset to said fastened condition.

18. The invention as defined in claim 11 further comprising means for cushioning potential impact resulting from the upward movement of said locking sleeve biased by said spring means.

19. A separation nut for fastening and releasing a threaded element, the separation nut comprising:
  a. a housing having a top end and a bottom end with an opening extending into a hollow chamber;
  b. a segmented nut located inside said chamber, the segmented nut having a threaded bore aligned with said bottom opening for receiving said threaded element, the segmented nut also having an exterior surface which has at least one raised ridge and at least one recessed groove, the segmented nut split radially into at least two segments;
  c. a locking sleeve biased by a spring means and placed over said segmented nut having an interior surface complementary to said exterior surface of said segmented nut, the interior surface of the locking sleeve has at least one retaining pin engageable with said exterior surface of said segmented nut; and
  d. at least one actuator assembly mounted on said top end of said housing for resisting or allowing said locking sleeve to move upwardly;
  e. whereby when said at least one actuator assembly is not actuated, said at least one retaining pin is engaged with said at least one ridge, so that said at least two segments of said segmented nut are compressed radially inwardly for fastening said threaded element, and when said at least one actuator assembly is actuated, said locking sleeve will move upwardly biased by said spring means, such that said at least one retaining pin will be engaged with said at least one groove, so that said at least two segments of said segmented nut can move radially outwardly for releasing said threaded element.

20. The invention as defined in claim 19 wherein said bottom end of said housing has a widened flange with means for mounting said housing to an external structure.

21. The invention as defined in claim 20 wherein said means for mounting the housing to said external structure includes at least one screw hole to accommodate at least one mounting screw for mounting said housing to said external structure.

22. The invention as defined in claim 19 wherein said exterior surface of said segmented nut is polygonal.

23. The invention as defined in claim 19 wherein said segmented nut splits radially into three segments.

24. The invention as defined in claim 19 wherein said spring means is a compression spring.

25. The invention as defined in claim 19 wherein said threaded bore of said segmented nut has an inward ramp surface engageable with an outward ramp surface on a ramp plunger which is attached inside said locking sleeve for facilitating said radially outward movement of said at least two segments of said segmented nut.

26. The invention as defined in claim 19 further comprising a ramp washer located adjacent to said bottom opening of said housing and engageable with said segmented nut for assisting said radially outward movement of said at least two segments of said segmented nut.

27. The invention as defined in claim 19 further comprising at least one reset screw threaded through at least one screw hole at said top end of said housing for forcing said locking sleeve to move downwardly, such that said at least one retaining pin is engaged with said at least one ridge, so that said at least two segments of said segmented nut are compressed radially inwardly for fastening said threaded element.

28. The invention as defined in claim 19 further comprising means for cushioning the movement of said locking sleeve biased by said spring means.

29. A separation nut for fastening and releasing a structural element, comprising:
  a. a housing having an opening extending into a hollow chamber;
  b. a segmented nut located inside said chamber, the segmented nut having a bore aligned with said opening for receiving said structural element, the segmented nut also having an exterior surface which has at least one raised ridge and at least one recessed groove, the segmented nut split radially into at least two segments;
  c. a locking sleeve biased by a spring means and placed over said segmented nut having an interior surface which has at least one retaining pin engageable with said exterior surface of said segmented nut; and
  d. a rocker means for preventing or allowing said locking sleeve to move;
  e. whereby when said locking sleeve is prevented from moving, said at least one retaining pin is engaged with said at least one ridge, so that said at least two segments of said segmented nut are compressed radially inwardly for fastening said structural element, and when said locking sleeve is allowed to move, said at least one retaining pin will be engaged with said at least one groove, so that said at least two segments of said segmented nut can move radially outwardly for releasing said structural element.

30. The invention as defined in claim 29 further comprising means for mounting said housing to an external structure.

31. The invention as defined in claim 29 wherein said bore of said segmented nut has an inward ramp surface engageable with an outward ramp surface on a ramp plunger which is attached inside said locking sleeve for facilitating said radially outward movement of said at least two segments of said segmented nut.

32. The invention as defined in claim 29 further comprising a ramp washer located adjacent to said opening of said housing and engageable with said segmented nut for assisting said radially outward movement of said at least two segments of said segmented nut.

33. The invention as defined in claim 29 further comprising means for resetting said locking sleeve to its original position where said at least one retaining pin is engaged with said at least one ridge, so that said at least two segments of said segmented nut are compressed radially inwardly for fastening said structural element.

34. The invention as defined in claim 29 further comprising means for cushioning the movement of said locking sleeve biased by said spring means.

* * * * *